(12) United States Patent
Ramle et al.

(10) Patent No.: US 12,408,134 B2
(45) Date of Patent: Sep. 2, 2025

(54) SYSTEMS AND METHODS FOR USER EQUIPMENT (UE) REGISTRATION

(71) Applicant: Telefonaktiebolaget LM Ericsson (publ), Stockholm (SE)

(72) Inventors: Peter Ramle, Mölnlycke (SE); Josefin Karlsson, Torslanda (SE); Lasse Olsson, Träslövsläge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 90 days.

(21) Appl. No.: 18/543,675

(22) Filed: Dec. 18, 2023

(65) Prior Publication Data
US 2024/0214963 A1 Jun. 27, 2024

Related U.S. Application Data

(63) Continuation of application No. 17/691,235, filed on Mar. 10, 2022, now Pat. No. 11,864,149, which is a continuation of application No. 16/314,241, filed as application No. PCT/EP2017/066160 on Jun. 29, 2017, now Pat. No. 11,277,809.

(60) Provisional application No. 62/357,576, filed on Jul. 1, 2016.

(51) Int. Cl.
*H04W 60/04* (2009.01)
*H04W 76/11* (2018.01)

(52) U.S. Cl.
CPC ............ *H04W 60/04* (2013.01); *H04W 76/11* (2018.02)

(58) Field of Classification Search
CPC ..... H04W 60/04; H04W 76/11; H04W 60/00; H04W 8/06
See application file for complete search history.

(56) References Cited

U.S. PATENT DOCUMENTS

| 7,035,621 | B1 | 4/2006 | Hurtta |
| 8,184,615 | B2 | 5/2012 | Tsirtsis |
| 8,537,779 | B2 | 9/2013 | Wu |
| 8,644,824 | B1 | 2/2014 | Sigg |
| 2004/0208126 | A1 | 10/2004 | Wassew |
| 2006/0109967 | A1 | 5/2006 | Kouchri |
| 2006/0128389 | A1 | 6/2006 | Hurtta |
| 2007/0081521 | A1 | 4/2007 | Tsirtsis |
| 2009/0010213 | A1 | 1/2009 | Yamada |

(Continued)

FOREIGN PATENT DOCUMENTS

| CN | 101064953 | 10/2007 |
| CN | 101115056 | 1/2008 |

(Continued)

OTHER PUBLICATIONS

First Examination Report dated Sep. 24, 2019 issued in Australian Patent Application No. 2017289322. (4 pages).

(Continued)

*Primary Examiner* — Ivan O Latorre
(74) *Attorney, Agent, or Firm* — Rothwell, Figg, Ernst & Manbeck, P.C.

(57) ABSTRACT

This disclosure combines the Attach and Tracking Area Update procedures into one new mobility procedure: the Registration procedure. One advantage of the proposed Registration procedure is that, if the new SHF is unable to obtain UE data from the old SHF the new SHF will nevertheless register the UE so that the UE does not have to perform another registration procedure (e.g., an Attach procedure).

11 Claims, 10 Drawing Sheets

(56) References Cited

U.S. PATENT DOCUMENTS

| | | |
|---|---|---|
| 2010/0040024 A1 | 2/2010 | Wu |
| 2010/0105385 A1 | 4/2010 | Tanabe |
| 2010/0220687 A1 | 9/2010 | Reznik |
| 2011/0007691 A1 | 1/2011 | Awano |
| 2011/0273986 A1 | 11/2011 | Le Rouzic |
| 2012/0127851 A1 | 5/2012 | Le Rouzic |
| 2012/0189016 A1 | 7/2012 | Bakker |
| 2014/0355417 A1 | 12/2014 | Kim |
| 2015/0063199 A1 | 3/2015 | Wang |
| 2015/0131437 A1 | 5/2015 | Kim |
| 2017/0195926 A1 | 7/2017 | Iwai |
| 2019/0007921 A1 | 1/2019 | Schliwa-Bertling |
| 2020/0389864 A1 | 12/2020 | Ramle |

FOREIGN PATENT DOCUMENTS

| | | |
|---|---|---|
| CN | 101902371 | 12/2010 |
| CN | 102025695 | 4/2011 |
| CN | 102761855 | 10/2012 |
| EP | 2 099 234 | 9/2009 |
| EP | 2 869 610 | 5/2015 |
| RU | 2009 136 529 | 4/2011 |
| WO | 02/32177 | 4/2002 |

OTHER PUBLICATIONS

International Search Report and Written Opinion issued in International Application No. PCT/EP2017/066160, dated Oct. 4, 2017, 13 pages.

Motorola, "Aligning TAU procedure with Attach", 3GPP TSG-SA2 Meeting #68, S2-087180, Qingdao, China, Oct. 13-17, 2008, 3 pages.

3GPP TS 23.401, V8.1.0 (Mar. 2008), 3rd Generation Partnership Project; Technical Specification Group Services and System Aspects; General Packet Radio Service (GPRS) enhancements for Evolved Universal Terrestrial Radio Access Network (E-UTRAN) access (Release 8), Mar. 2008, 20 pages.

Ericsson, "Core Network Architecture & Functional Allocation", SA WG2 Temporary Document, SA WG2 Meeting #115, S2-162502, Nanjing, P.R. China, May 23-27, 2016, 8 pages.

3GPP TR 23.799, V0.5.0 (May 2016), 3rd Generation Partnership Project; Technical Specification Group Services and System Aspects; Study on Architecture for Next Generation System (Release 14), May 2016, 178 pages.

Nokia, "Architecture Requirements, Principles and Assumption: Reference architecture model based on assumptions," S2-162146, SA WG2 Meeting #S2-114, Apr. 11-15, 2016, Sophia Antipolis, FR (4 pages).

Decision to Grant dated Oct. 10, 2019 issued in Russian Patent Application No. 2019102669/07. (17 pages).

SYSTEMS AND METHODS FOR USER EQUIPMENT (UE) REGISTRATION

CROSS-REFERENCE TO RELATED APPLICATIONS

This application is a continuation of U.S. application Ser. No. 17/691,235, filed on 2022 Mar. 10 (now U.S. Pat. No. 11,864,149, issued on 2024 Jan. 2), which is a continuation of U.S. application Ser. No. 16/314,241, filed on 2018 Dec. 28 (now U.S. Pat. No. 11,277,809, issued on 2022 Mar. 15), which is the U.S. national stage of international patent application no. PCT/EP2017/066160, filed on 2017 Jun. 29, which claims priority to U.S. provisional patent application No. 62/357,576, filed on 2016 Jul. 1. The above identified applications are incorporated by this reference.

TECHNICAL FIELD

Aspects of this disclosure relate to systems and methods for registering a user equipment (UE) in a network.

BACKGROUND

A UE is a wireless communication device, such as, for example, a smartphone, a tablet, a computer, an appliance, a sensor, etc. Currently there exists two separate procedures for registering a UE with a core network of an Long Term Evolution (LTE) 4G communications network: (1) the Attach procedure and (2) the Tracking Area Update (TAU) procedure.

SUMMARY

Having two separate registration procedures means that there will be parallel tracks of standardization, UE and CN implementation, tests, descriptions (such as customer descriptions), operator deployments/tests etc. thus imposing extra costs.

Currently, when a signal handling function (SHF) (a.k.a., "Terminal Handling Function" or "Access and Mobility Management Function" (AMF)) receives a TAU request from a UE and the SHF (e.g., a Mobility Management Entity (MME)) was not the last SHF to serve the UE (i.e., the SHF is a "new SHF"), the new SHF attempts to fetch information about the UE (e.g., the UE's Mobility Management (MM) Context, Session related data etc.) from the last SHF that was previously serving the UE (i.e., the "old SHF") and, if that isn't possible, the new SHF shall reject the TAU request with an appropriate cause code causing the UE to understand that the UE must perform an Attach procedure to get registered with the network. In this scenario, the TAU request from the UE could have been perfectly correct but still the UE will be required to perform the Attach procedure, thereby causing extra signaling over the air, more control signaling handling in the radio access network (RAN) and core network (CN), and adding latency to the registration procedure.

Accordingly, this disclosure proposes combining the Attach and Tracking Area Update procedures into one new mobility procedure: the Registration procedure. One advantage of the proposed Registration procedure is that, if the new SHF is unable to obtain UE data from the old SHF the new SHF will nevertheless register the UE so that the UE does not have to perform another registration procedure (e.g., an Attach procedure).

Another benefit is that the same mobility procedure will be used regardless of whether the UE is attempting to attach to the network or whether the UE has changed Tracking Area due to mobility. The current Attach and TAU procedures use many similar messages and some of them have many information elements where the most of them are common. Also there are cases where the procedures use the same messages. Therefore, both the UE and the SHF (which may be a component of a Core Control Function CCF) can use "a common" implementation and thereby an easier implementation. Also, it enables simplicity of "one track" for future additions of different aspects: standardization, UE and CN implementation, tests, descriptions (such as customer descriptions), operator deployments/tests etc.

Accordingly, in one aspect there is provided a method for registering a user equipment (UE) wherein the method is performed by the UE. The method includes the UE transmitting toward a first signal handling function (SHF) a request message requesting a certain type of registration. The method also includes the UE receiving a registration accept message transmitted by the first SHF after the first SHF processes the request message. The request message comprises: (i) an identifier allocated to the UE, which may be a permanent identifier (PID) or a temporary identifier (TID) and (ii) registration type information enabling the first SHF to determine the type of registration that the UE is requesting (e.g., registration type information that enables the first SHF to determine whether the UE is requesting an "initial" registration or a "normal" registration).

In some embodiments, the registration type information consists of a one bit flag enabling the first SHF to determine whether the UE is requesting a first type of registration (e.g., "initial") or a second type of registration (e.g., "normal").

In some embodiments, the registration type information comprises a value selected from a pre-defined set of two or more values.

In some embodiments, the request message comprises the PID allocated to the UE, and the registration accept message comprises a globally unique temporary identifier (GUTI) allocated to the UE. In such an embodiment the method may further comprise: the UE accepting the GUTI and the UE transmitting, in response to the registration accept message, a registration complete message comprising an indication that the UE has accepted the GUTI.

In some embodiments, the request message does not include the PID allocated to the UE, and the method further comprises: after transmitting the request message and before receiving the registration accept message, the UE receiving an identity request transmitted by the first SHF, the identity request requesting that the UE transmit an identity response comprising the PID allocated to the UE. The UE, in response to the identity request, transmits to the first SHF an identity response comprising the PID allocated to the UE.

In some embodiments, the registration accept message comprises registration result information for enabling the UE to determine whether the first SHF performed an initial registration procedure or a normal registration procedure in response to receiving the request message.

In some embodiments, the registration type information indicates that the UE is requesting a normal registration, and the registration accept message includes registration result information indicating that the first SHF completed a procedure for an initial registration procedure instead of performing a procedure for the requested normal registration. In some embodiments, the registration result information consists of a one bit flag.

In some embodiments, the request message further comprises message type information indicating that the request message is Registration Request message, and the message type information included in the Registration Request message is separate and distinct from the registration type information included in the Registration Request message.

In some embodiments, the UE transmitted the request message as a result of the UE detecting that the UE has entered a "new" Tracking area—for example, a Tracking area that is outside the UE's tracking area list or an area that is outside of the UE's Registration area.

In another aspect there is provided a UE that is adapted to perform the above described methods.

In another aspect there is provided a method for registering the UE, where the method is performed by the first SHF. The method includes the first SHF, receiving a request message transmitted by the UE, the request message requesting a certain type of registration. The method further includes the first SHF processing the request message, wherein the request message comprises: (i) an identifier allocated to the UE and (ii) registration type information enabling the first SHF to determine the type of registration that the UE is requesting.

In some embodiments, the step of processing the request message comprises examining the registration type information included in the request message to determine whether the UE is requesting an initial registration or a normal registration.

In some embodiments, the first SHF determines, based on the registration type information, that the UE is requesting an initial registration, and the method further comprises: the first SHF determining whether the request message includes a PID or a TID. In some embodiments, the first SHF determines that the request message does not include the PID, the first SHF determines that the first SHF does not have certain context information for the UE, and the method further comprises: as a result of determining that the request message does not include the PID and the first SHF does not have certain context information for the UE, the first SHF determining an address of a second SHF and the first SHF sending to the determined address an information request message comprising (i) information for identifying the UE and (ii) registration type information indicating that the identified UE is requesting an initial registration. In some embodiments, the second SHF determines, based on the registration type information included in the information request message, that the identified UE is requesting an initial registration, and, as a result of determining that the identified UE is requesting an initial registration, the second SHF retrieves information associated with the identified UE and transmits to the first SHF an information response message comprising the retrieved information, wherein the retrieved information comprises context data associated with the UE and the PID allocated to the UE.

In some embodiments, the registration type information indicates that the UE is requesting an initial registration, the request message includes the TID, and the method further comprises: the first SHF determining that the first SHF has certain context information for the UE; and after the first SHF determines that it has the certain context information, the first SHF transmits to the UE a registration accept message.

In some embodiments, the registration type information indicates that the UE is requesting an initial registration, the request message includes the PID, and the method further comprises: the first SHF transmitting to the UE a registration accept message comprising a temporary identifier allocated to the UE; and the first SHF receiving a registration complete message transmitted by the UE, wherein the registration complete message includes an indication that the UE has accepted the temporary identifier included in the registration access message.

In some embodiments, the registration type information indicates that the UE is requesting a normal registration, and the method further comprises: the first SHF determining that it does not have certain context information for the UE; the first SHF determining an address of a second SHF; and the first SHF sending to the determined address an information request message comprising: information for identifying the UE and registration type information indicating that the identified UE is requesting an normal registration.

In some embodiments, the method further comprises the second SHF determining, based on the registration type information included in the information request message, that the identified UE is requesting a normal registration; and, as a result of determining that the identified UE is requesting the normal registration, the second SHF retrieves information associated with the identified UE and transmits to the first SHF an information response message comprising the retrieved information, wherein the retrieved information comprises context data associated with the UE, session data associated with the UE, and the PID allocated to the UE.

In some embodiments, the method further comprises the first SHF receiving an information response that was transmitted by the second SHF after the second SHF processed the information request; the first SHF determining whether the information response includes the PID allocated to the UE; and as a result of the first SHF determining that the information response does not include the PID allocated to the UE, the first SHF transmitting to the UE an identity request requesting that the UE transmit an identity response comprising the PID allocated to the UE.

In some embodiments, the request message comprises the temporary identifier, and the method further comprises: the first SHF determining whether an identity request message should be sent to the UE; as a result of the first SHF determining that an identity request message should be sent to the UE, the first SHF transmitting to the UE the identity request message; and after transmitting the identity request message to the UE, the first SHF receiving from the UE an identity response message comprising the permanent identifier.

In some embodiments, determining whether an identity request message should be sent to the UE comprises: the first SHF determining that the temporary identifier maps to an old SHF; and the first SHF determining that it does not have an interface to the old SHF.

In some embodiments, determining whether an identity request message should be sent to the UE comprises: the first SHF determining that the temporary identifier maps itself; and the first SHF determining that it does not have the permanent identifier.

In some embodiments, the method further comprises the first SHF transmitting to the UE a registration accept message comprising registration result information for enabling the UE to determine whether the first SHF performed an initial registration procedure or a normal registration procedure in response to receiving the request message.

In another aspect there is provided a first SHF that is adapted to perform the methods described above.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
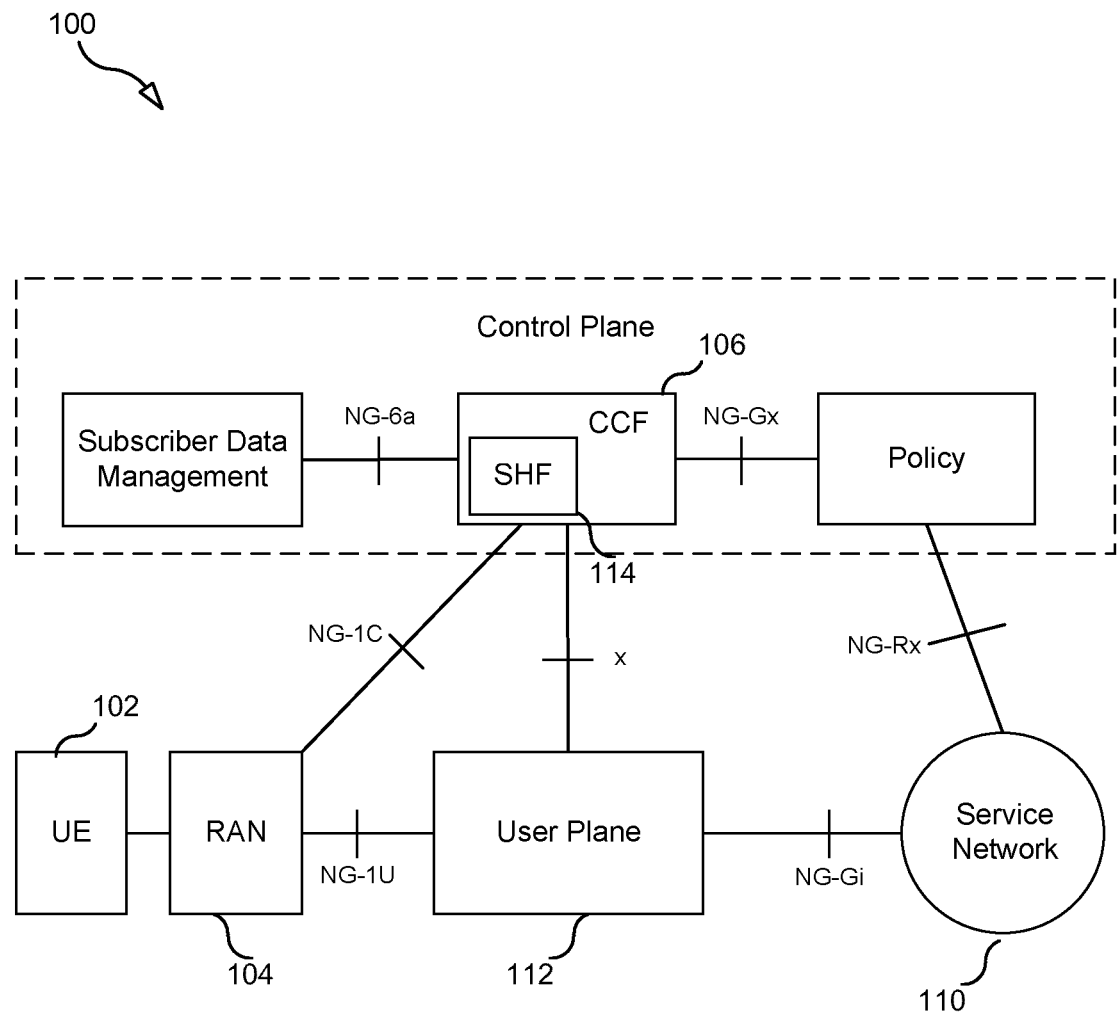
FIG. 1 illustrates a system according to some embodiments.

FIG. 1 illustrates a system 100 according to some embodiments. As shown in FIG. 1, system 100 includes a UE 102 communicating with an SHF 114 of a core network (shown in FIG. 1 as a part of CCF 106), via an access network 104 (e.g., a radio access network (RAN)). UE 102 can communicate with devices attached to Service Network 110 (e.g., to further connect to the Internet) via RAN 104 and user plane 112 functions of a core network.

As discussed above, this disclosure describes a new procedure that combines elements of the existing Attach procedure (used in LTE) with elements of the existing Tracking Area Update, TAU mobility procedure (used in LTE). This new procedure is named the "Registration" procedure. The Registration procedure is used e.g. when the UE attaches into the mobile network, upon mobility procedure when the UE changes to a new Tracking area (TA) (e.g., the UE moves into an area identified by a Tracking area identifier that is not included in the UE's list of Tracking area identifiers), when the UE performs a periodic update (due to a predefined time period of inactivity), load re-balancing reasons etc. Upon a TA change, there are different options: the same CN functions are kept or a CN function (e.g. CCF, SHF, CHF-C, CHF-U) is changed or some/all CN entities/functions are changed.

The Registration procedure can be used with a new radio access technology (RAT) (e.g., a 5G RAT) or existing RAT (e.g. WLAN and Fixed access)). Typically, UEs with session(s) are Mobile Broadband (MBB) subscribers or Fixed Wireless Access (FWA) subscribers, while UEs without any sessions are simple IoT devices. There may be other cases. As an alternative, UEs allowed to establish a session can register without session and afterward a session can be established.

Figure 2:
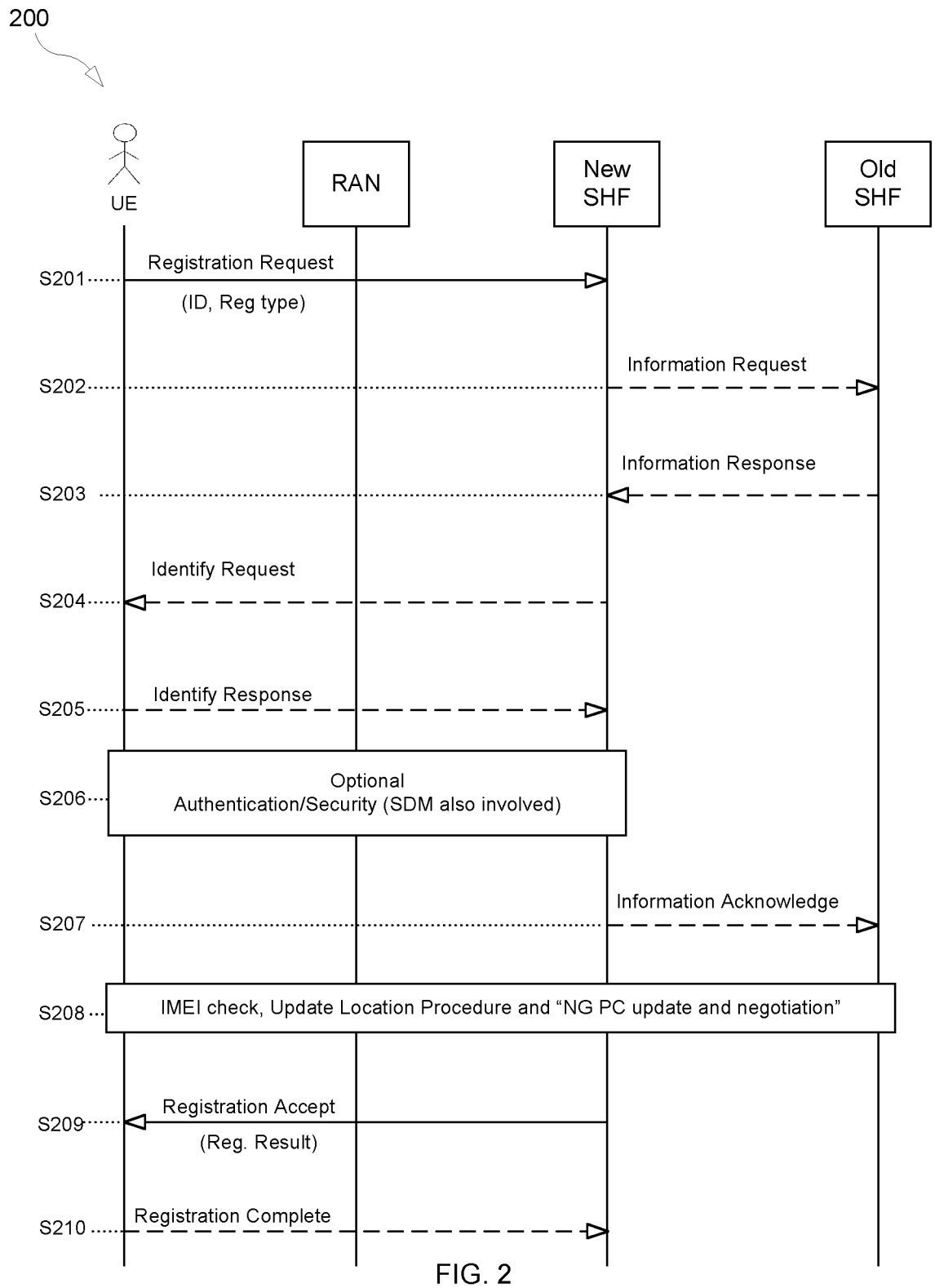
FIG. 2. is a message flow diagram illustrating a message flow according to some embodiments.

The Registration procedure will support idle mode mobility with or without session. FIG. 2 shows a Registration procedure example without session established, according to some embodiments.

The Registration procedure begins in step s201 with the UE sending a Registration Request (RR) message to, in this case, a new SHF. The Registration Request message includes an identifier (ID) assigned to the UE. The ID assigned to the UE may be a permanent identifier (PID) assigned to the UE (e.g. the UE's International Mobile Subscriber Identity (IMSI)) or a temporary ID (TID) assigned to the UE by, e.g., an SHF (e.g., globally unique temporary identifier (GUTI)). Advantageously, the Registration Request message further includes registration type information enabling the new SHF to determine whether the UE is requesting an initial registration (i.e. the UE is not in a Registered state) or a normal registration (i.e. the UE is in Registered state). In some embodiments, the Registration Request message includes a Registration Flag Information Element (IE) containing the registration type information. The registration type information may consist of a one bit flag or the registration type information may consists of a "value" (e.g., a numerical value or string) selected from a pre-defined set of two or more pre-defined values. For example, the set of pre-defined values may include the following pre-defined values: "initial" and "normal".

If the UE is requesting "initial" registration, then the Registration Request (RR) message includes, in some embodiments, all necessary parameters for that (as in Attach in LTE). If the UE is requesting "normal" registration, then the RR message includes all necessary parameters for that (as in TAU in LTE).

There is an additional case: If the UE presents a temporary identifier (e.g. GUTI) and that temporary identifier points to the new SHF but the UE context has been removed in the new SHF then the registration can still be handled by the new SHF but step s202 and step s203 needs to be performed in order to fetch the permanent id (e.g. IMSI) from the UE.

In step s202, if necessary, the new SHF sends an Information Request (IR) message to the old SHF (assuming the new SHF has an interface to the old SHF—i.e., assuming the new SHF is able to send messages to and receives messages from the old SHF). The IR message includes some or all of the parameters from the RR (e.g., registration type and UE identifier) and an address assigned to a network interface of the new SHF. Advantageously, the IR message includes registration type information so that the old SHF can determine whether the UE is requesting an initial or normal registration. Step s202, it should be noted, is not always necessary. That is, step s202 is not performed in at least the following two cases: 1) the UE is requesting "initial" registration and the RR message includes a permanent ID (PID) for the UE (e.g., IMSI) and 2) the RR message includes a temporary ID (TID) and the TID maps to the new SHF itself.

In step s203 (not performed if step s202 is not performed), the old SHF responds to new SHF with an Information Response message including, for example, a permanent ID assigned to the UE (e.g., the UE's IMSI), MM Context (which may include quality of service (QoS) parameters for the UE such as, for example, uplink and downlink Aggregate maximum bit rate (AMBR) information as well as UE capability information) and an address assigned to a network interface of the old SHF. If the registration type information included in the IR indicates that the UE has requested normal registration, then the old SHF will include in the Information Response message session related data associated with the UE (e.g., an IP address that was assigned to the UE) that the old SHF is maintaining.

In the case where the new SHF needs to obtain the UE's permanent ID (PID) (e.g., in the case where the RR message did not include the PID and the new SHF does not have the PID and was unable to obtain the PID from an old SHF), then in step s204 the new SHF transmits to the UE an Identity Request message requesting the UE to provide to the new SHF the UE's PID (e.g., IMSI). Thus, for example, if the RR message includes a TID rather than a PID and the TID maps to an old SHF, as opposed to mapping to the new SHF, and the new SHF does not have an interface to the old SHF (or the Information Response from the old SHF does not include the UE's PID), then step s204 is performed by the new SHF. Additionally, if the TID maps to the new SHF and the new SHF does not have the UE's PID, then the new SHF will perform step s204.

In step s205, the UE responds with an Identity Response message including a permanent ID assigned to the UE (e.g. UE's IMSI).

In step s206, the new SHF may initiate authentication of the UE if the Registration Request was not sent integrity protected or integrity protection is indicated as failed in step s203 (Information Response). That is, in step s206, Non-Access Stratum (NAS) security functions are performed.

In step s207, the new SHF responds to the old SHF with an Information Acknowledge (IA) message if a successful Information Response is received. In response to receiving the IA message, the old SHF marks as invalid (or deletes) the MM context information associated with the UE that the old SHF was maintaining.

In some embodiments, in step s208, the new SHF may perform an Update Location procedure. Additionally, the new SHF may perform one or more of the following procedures: an International Mobile Equipment Identity (IMEI) check and a Policy Control (PC) update and negotiation are performed.

In step s209, the new SHF sends to the UE a Registration Accept (RA) message comprising information indicating a result of the registration. In on embodiments, assuming the registration was successful, there are two possible results: "initial" and "normal." More specifically: (1) if the UE requested initial registration and the initial registration was successful, then the RA message will include information indicating that the requested initial registration has been successfully performed; (2) if the UE requested normal registration and the normal registration was successful, then the RA message will include information indicating that the requested normal registration has been successfully performed; and (3) if the UE requested normal registration and the normal registration was not successful because, for example, the new SHF was unable to retrieve information from old SHF, but the new SHF successfully performed an initial registration, then the RA message will include information indicating that an initial registration has been successfully performed. Additionally, if the registration (initial or normal) was successful, then the RA message may further include a temporary ID assigned to the UE.

In step s210, the UE may respond to the new SHF with a Registration Complete message, which message indicates that the UE has accepted the new temporary ID.

Figure 3:
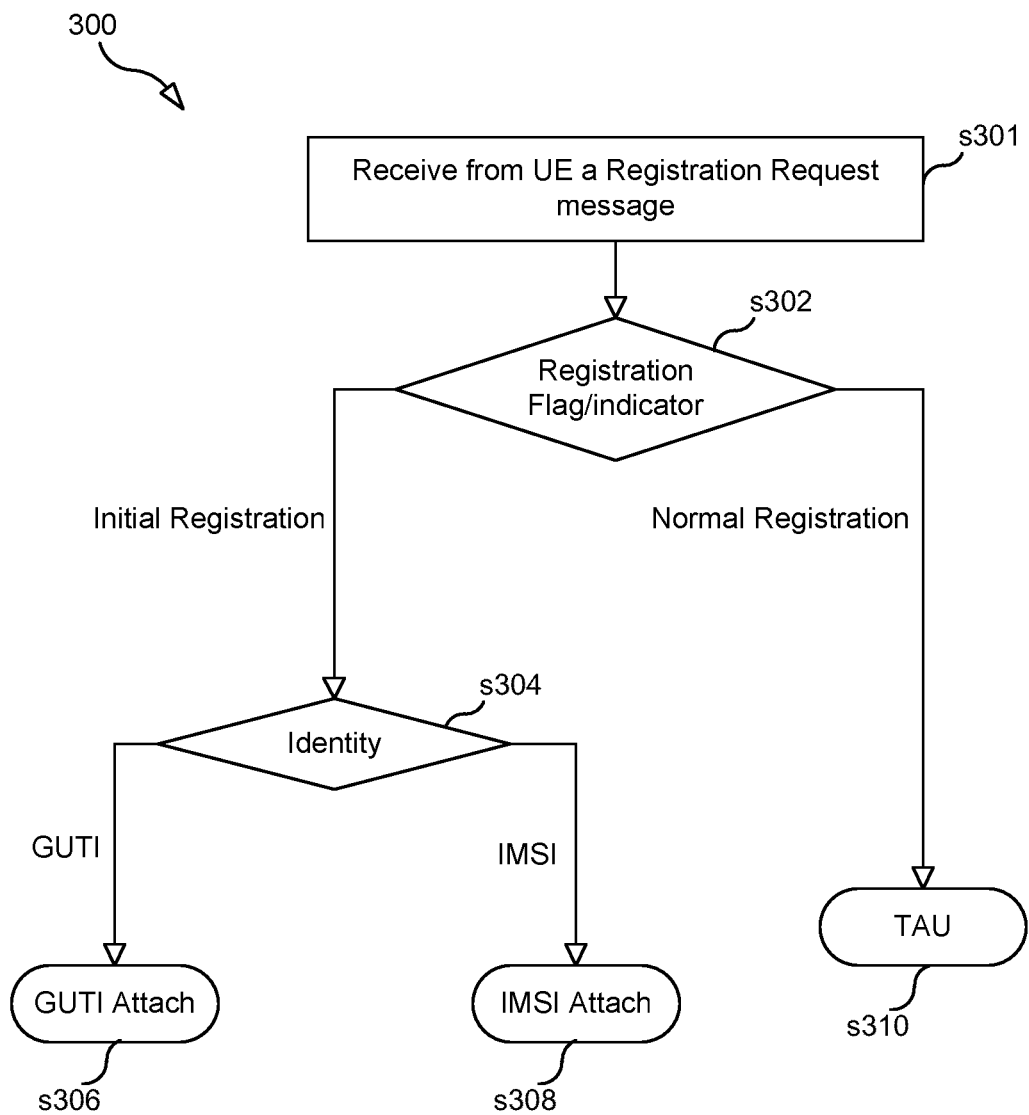
FIG. 3 is a flowchart illustrating a process according to some embodiments.

Referring now to FIG. 3, FIG. 3 is a flow chart illustrating a process 300 according to some embodiments.

Process 300 begins in step s301, where an SHF receives an RR message transmitted by a UE. In step s302, the SHF determines the type of registration that the UE is requesting. For example, the SHF examines the registration type information included in the RR message to determine whether the UE is requesting "initial registration" or "normal registration." If initial registration is requested, the process proceeds to step s304, otherwise the process proceeds to step s310. In step s304, the SHF determines whether the RR message includes a permanent ID assigned to the UE. If it does, the process proceeds to step s308, otherwise the process proceeds to step s306. In step s306, the SHF performs a GUTI Attach procedure. In step s308, the SHF performs an IMSI Attach procedure. And in step s310, the SHF performs a TAU procedure.

Figure 4:
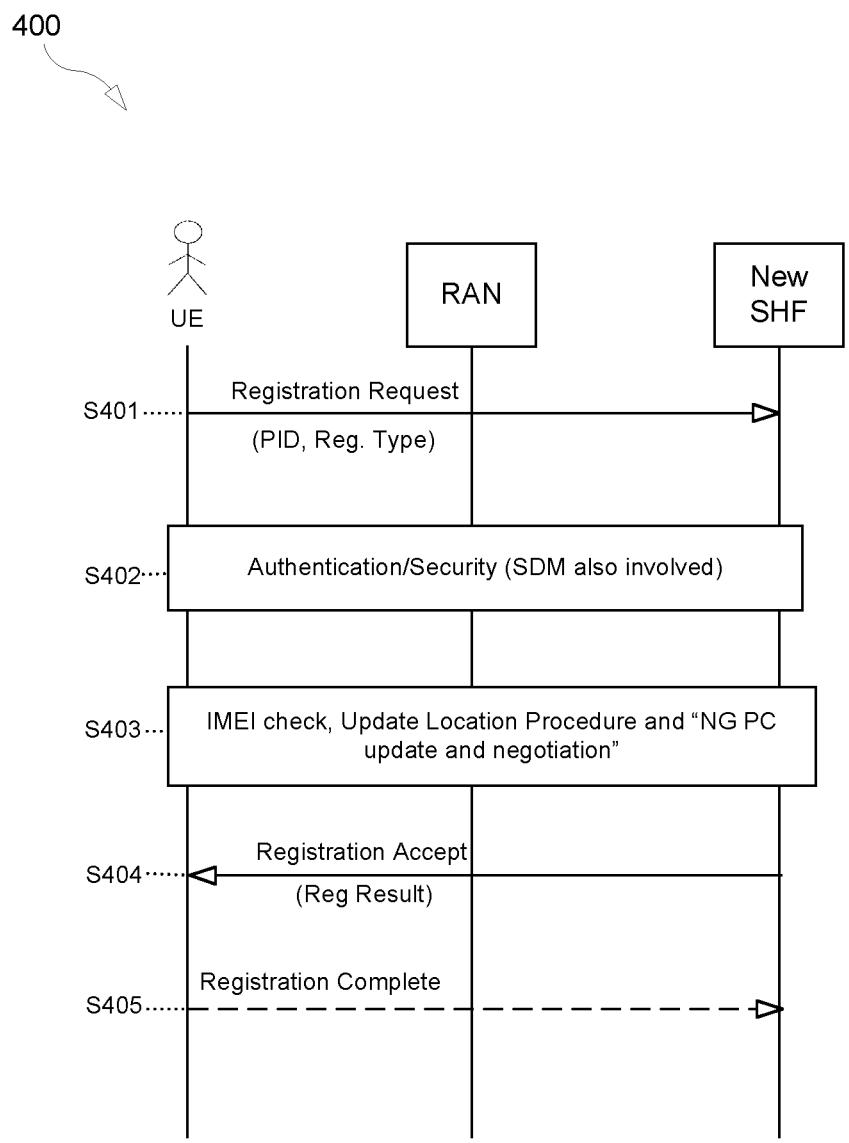
FIG. 4. is a message flow diagram illustrating a message flow according to some embodiments.

Referring now to FIG. 4, FIG. 4 is a message flow diagram illustrating the Registration procedure when the RR includes an permanent ID (e.g., IMSI) and the type information indicates the UE is requesting "initial" registration.

In step s401, the UE sends an RR message to, in this case, a new SHF. The RR message in this example includes a permanent identifier (ID) assigned to the UE (e.g. the UE's International Mobile Subscriber Identity (IMSI)) and registration type information indicating that the UE is requesting an initial registration (i.e., the UE is currently not in a Registered state).

In step s402, the new SHF initiate authentication of the UE if the RR was not sent integrity protected. That is, in step s402, Non-Access Stratum (NAS) security functions are performed.

In some embodiments, in step s403, the new SHF may perform an Update Location procedure. Additionally, the new SHF may perform one or more of the following procedures: an International Mobile Equipment Identity (IMEI) check and a Policy Control (PC) update and negotiation are performed.

In step s404, the new SHF sends to the UE a Registration Accept (RA) message comprising information indicating a result of the initial registration. Additionally, if the initial registration was successful, then the RA message may further include a temporary ID assigned to the UE.

In step s405, the UE may respond to the new SHF with a Registration Complete message, which message indicates that the UE has accepted the new temporary ID.

Figure 5:
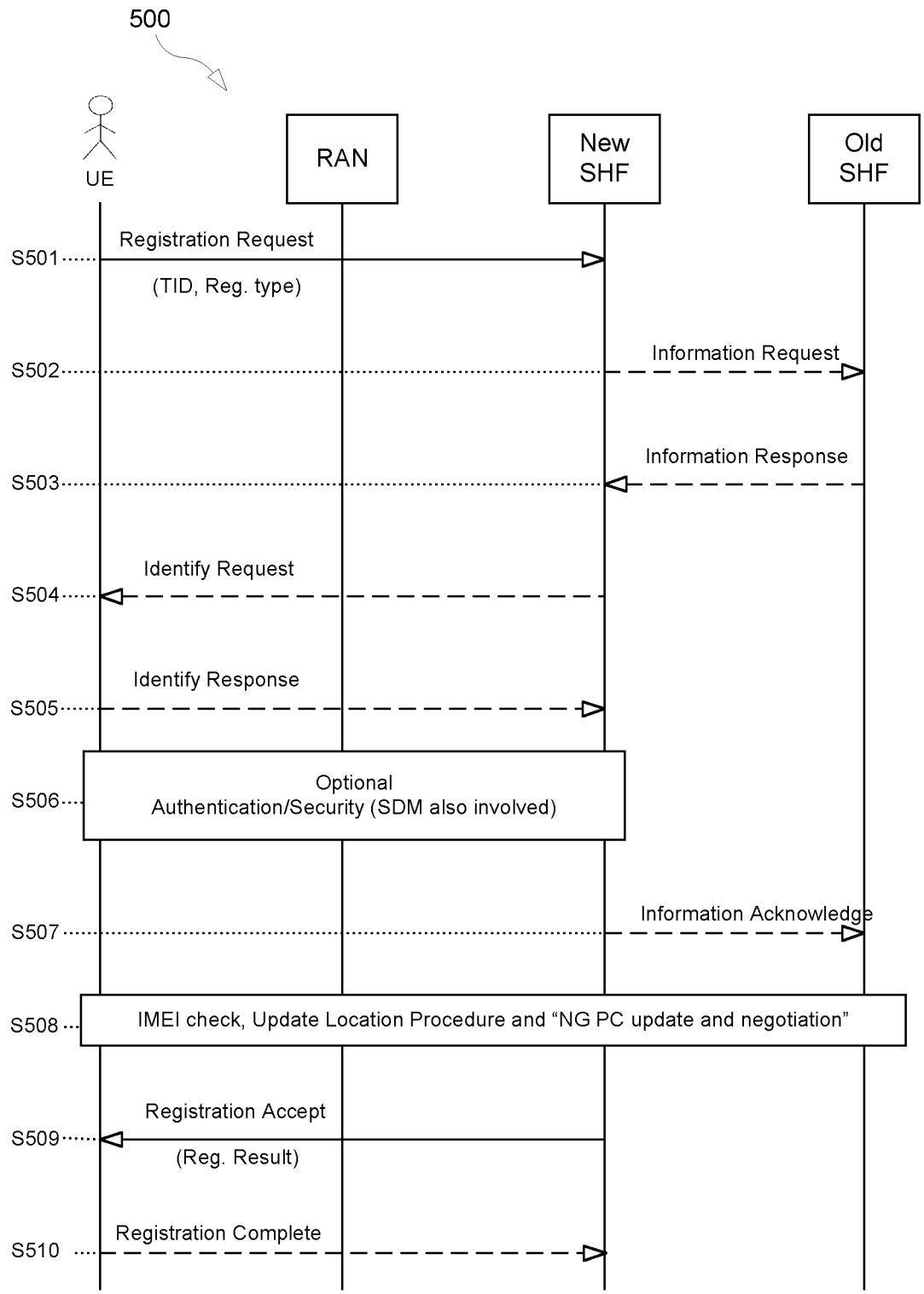
FIG. 5. is a message flow diagram illustrating a message flow according to some embodiments.

Referring now to FIG. 5, FIG. 5 is a message flow diagram illustrating the Registration procedure when the RR includes a temporary ID (e.g., GUTI) and the type information indicates the UE is requesting "initial" registration.

In step s501, the UE sends an RR message to, in this case, a new SHF. The RR message in this example includes a temporary ID (TID) assigned to the UE and registration type information indicating that the UE is requesting an initial registration (i.e., the UE is currently not in a Registered state).

In step s502, the new SHF sends an IR message to the old SHF (assuming that (a) the TID maps to the old SHF as opposed to mapping to the new SHF itself and (b) the new SHF has an interface to the old SHF). Advantageously, the IR message includes registration type information so that the old SHF can determine that the UE is requesting an initial registration.

In step s503, the old SHF responds with Information Response to new SHF including e.g. a permanent ID assigned to the UE (e.g., IMSI), MM Context and SHF address assigned to a network interface of the old SHF. Because the registration type indicates an initial registration, the old SHF will not include in the Information Response any session related data associated with the UE.

In the case where the new SHF needs to obtain the UE's permanent ID (PID) (e.g., in the case where the RR message did not include the PID and the new SHF does not have the PID and was unable to obtain the PID from an old SHF), then in step s504 the new SHF transmits to the UE an Identity Request message requesting the UE to provide to the new SHF the UE's PID (e.g., IMSI).

In step s505, the UE responds with an Identity Response message including a permanent ID assigned to the UE (e.g. UE's IMSI).

In step s506, the new SHF may initiate authentication of the UE if the Registration Request was not sent integrity protected or integrity protection is indicated as failed in step s503 (Information Response).

In step s507, the new SHF responds to the old SHF with an Information Acknowledge (IA) message if a successful Information Response is received. In response to receiving the IA message, the old SHF marks as invalid (or deletes) the MM context information associated with the UE that the old SHF was maintaining.

In some embodiments, in step s508, the new SHF may perform an Update Location procedure. Additionally, the new SHF may perform one or more of the following procedures: an International Mobile Equipment Identity (IMEI) check and a Policy Control (PC) update and negotiation are performed. Other procedures may also be performed, as is known in the art, such as a create session procedure.

In step s509, the new SHF sends to the UE a Registration Accept (RA) message comprising information indicating a result of the initial registration. Additionally, if the initial registration was successful, then the RA message may further include a temporary ID assigned to the UE.

In step s510, the UE may respond to the new SHF with a Registration Complete message, which message indicates that the UE has accepted the new temporary ID.

Figure 6:
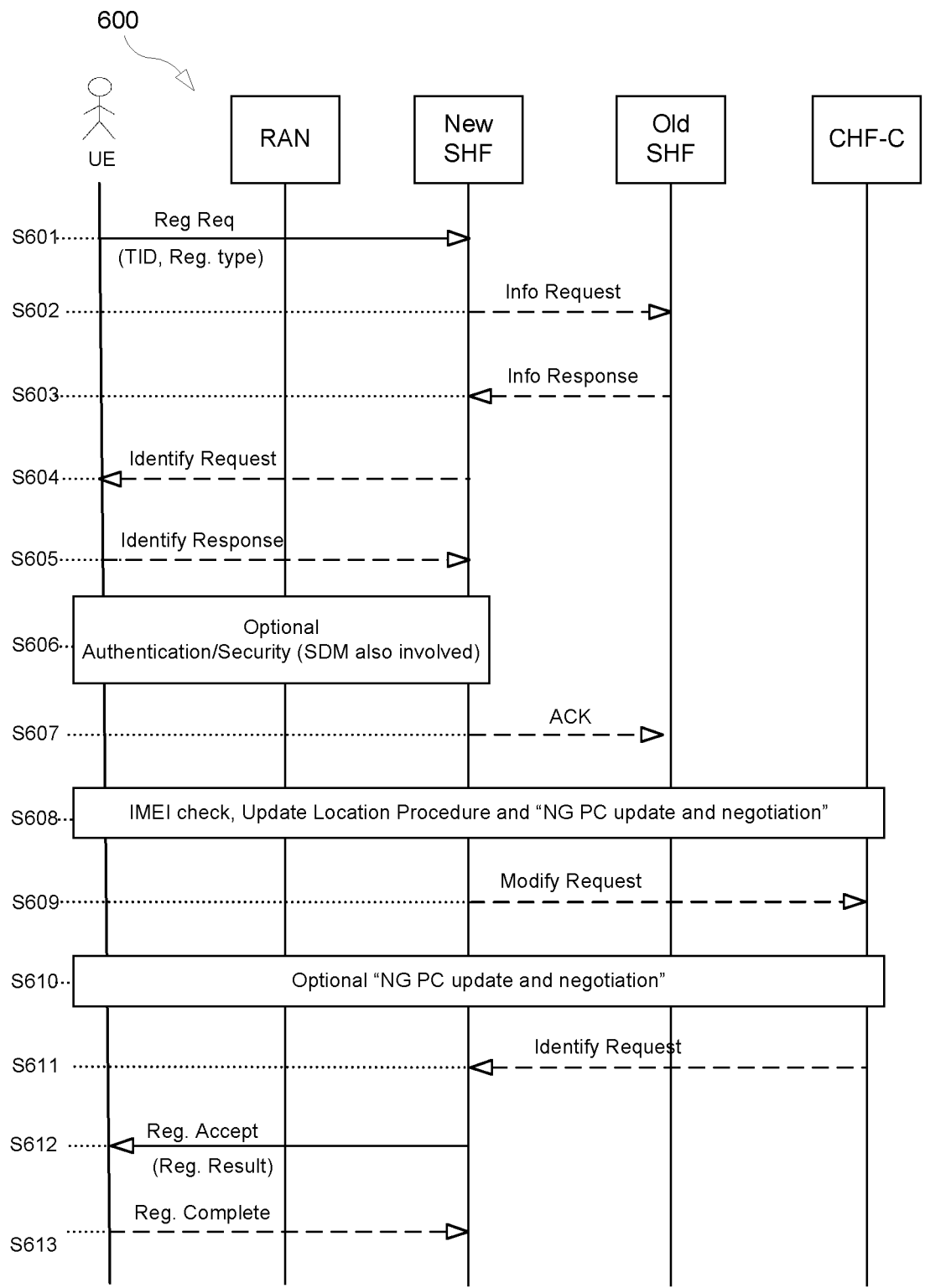
FIG. 6. is a message flow diagram illustrating a message flow according to some embodiments.

Referring now to FIG. 6, FIG. 6 is a message flow diagram illustrating the Registration procedure where RR indicates that the UE is requesting "normal" registration.

In step s601, the UE sends an RR message to, in this case, a new SHF. The RR message in this example includes a temporary ID assigned to the UE and registration type information indicating that the UE is requesting a normal registration.

In step s602, the new SHF sends an IR message to the old SHF. Advantageously, the IR message includes registration type information so that the old SHF can determine that the UE is requesting a normal registration.

In step s603, the old SHF responds with Information Response to new SHF including e.g. a permanent ID assigned to the UE, MM Context and SHF address assigned to a network interface of the old SHF. Because the registration type indicates a normal registration, the old SHF will also include in the Information Response any session related data associated with the UE that the old SHF has maintained.

In the case where the new SHF needs to obtain the UE's permanent ID (PID) (e.g., in the case where the RR message did not include the PID and the new SHF does not have the PID and was unable to obtain the PID from an old SHF), then in step s604 the new SHF transmits to the UE an Identity Request message requesting the UE to provide to the new SHF the UE's PID (e.g., IMSI).

In step s605, the UE responds with an Identity Response message including a permanent ID assigned to the UE (e.g. UE's IMSI).

In step s606, the new SHF may initiate authentication of the UE if the Registration Request was not sent integrity protected or integrity protection is indicated as failed in step s603 (Information Response).

In step s607, the new SHF responds to the old SHF with an Information Acknowledge (IA) message if a successful Information Response is received. In response to receiving the IA message, the old SHF marks as invalid (or deletes) the MM context information associated with the UE that the old SHF was maintaining.

In some embodiments, in step s608, the new SHF may perform an Update Location procedure. Additionally, the new SHF may perform one or more of the following procedures: an International Mobile Equipment Identity (IMEI) check and a Policy Control (PC) update and negotiation are performed.

In step s609, the new SHF sends to a CHF-C a Modify Request to indicate to the CHF-C that a new SHF is handling the UE (e.g., to re-establish the session).

In step s610, the new SHF may perform a PC update and negotiation.

In step s611. the new SHF receives a Modify Response from the CHF-C.

In step s612, the new SHF sends to the UE a Registration Accept (RA) message comprising result information indicating a result of the normal registration and a temporary ID assigned to the UE. As described above, the RA message in some scenarios (e.g., scenario where new SHF is not able to communicate with old SHF) includes result information indicating that an initial registration has been successfully performed.

In step s613, the UE may respond to the new SHF with a Registration Complete message, which message indicates that the UE has accepted the new temporary ID.

Figure 7:
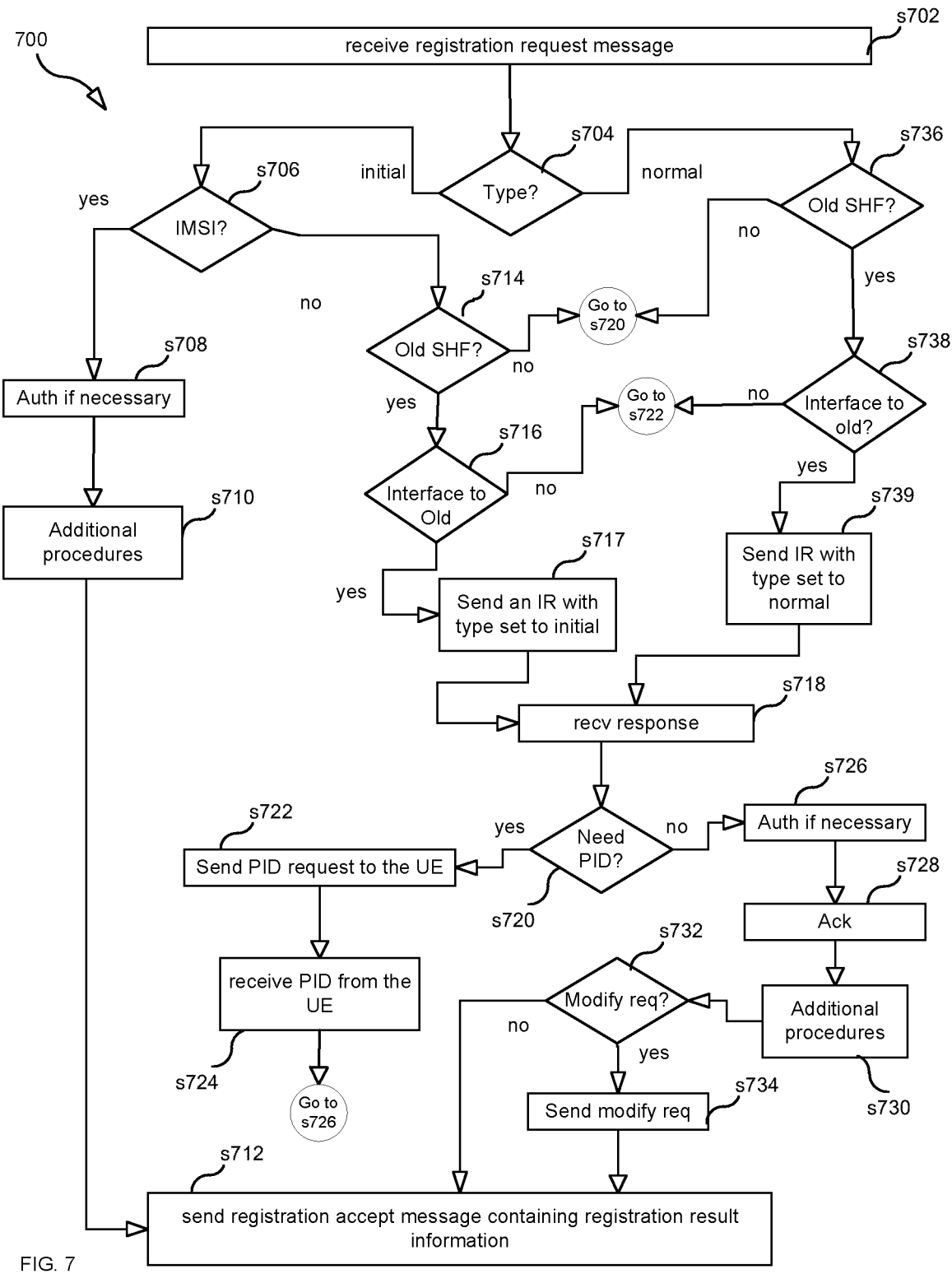
FIG. 7 is a flowchart illustrating a process according to some embodiments.

Referring now to FIG. 7, FIG. 7 is a flow chart illustrating a process 700, according to some embodiments, that is performed by an SHF.

In step s702, the SHF receives an RR message transmitted by a UE.

In step s704, the SHF obtains from the message the registration type information to determine whether the UE is requesting initial or normal registration. If requesting initial, then process goes to step s706 otherwise process goes to step s736.

In step s706, the SHF examines the RR message to determine whether it contains a permanent ID assigned to the UE. If it does, the process goes to step s708, otherwise it goes to step s714.

In step s708, the SHF initiate authentication of the UE if the RR message was not sent integrity protected.

In step s710, the SHF may perform additional procedure. For example, the SHF may perform an Update Location procedure. Additionally, the SHF may perform one or more of the following procedures: an International Mobile Equipment Identity (IMEI) check and a Policy Control (PC) update and negotiation.

In step s712, the SHF sends to the UE the RA message as described above.

In step s714, the SHF determines whether the TID included in the RR message maps to another SHF (i.e., an "old SHF"). If the TID maps to an old SHF, then the process proceeds to step s716, otherwise it proceeds to step s720.

In step s716, the SHF determines whether it has an interface to the old SHF. If it does, then the process proceeds to step s717, otherwise the process proceeds to step s722

In step s717, the SHF sends to the old SHF an Information Request (IR) message indicating "initial" registration.

In step s718, SHF receives from the old SHF a response to the Information Request message. If, however, for some reason the old SHF does not respond to the IR message (or the old SHF responds but the response does not make it back to the SHF), then step s718 cannot be performed and the process goes directly to step s720.

In step s720, the SHF determines whether it needs to obtain a permanent ID (PID) for the UE. If SHF needs to obtain a PID, then the process goes to step s722, otherwise it goes to step s726. For example, if the response from the old SHF does not include the PID, then the SHF performs step s722. Similarly, if the SHF receives no response from the old SHF, then the SHF performs step s722.

In step s722, the SHF sends to the UE a PID request requesting the UE to provide to the SHF a PID assigned to the UE.

In step s724, the SHF receives from the UE the requested PID.

In step s726, the SHF initiate authentication of the UE if the RR message was not sent integrity protected or integrity protection is indicated as failed in the Information Response received in step s718.

In step s728, the SHF sends to the old SHF an Information Ack meessage.

In step s730, the SHF may perform additional procedure. For example, the SHF may perform an Update Location procedure. Additionally, the SHF may perform one or more of the following procedures: an International Mobile Equipment Identity (IMEI) check and a Policy Control (PC) update and negotiation.

In step s732, the SHF determines whether it needs to send to a CHF-C a Modify Request message. If so, the process goes to step s734 otherwise the process goes to step s712.

In step s734, the SHF sends the Modify Request to the CHF-C.

In step s736, the SHF determines whether the TID included in the RR message maps to another SHF (i.e., an "old SHF"). If the TID maps to an old SHF, then the process proceeds to step s738, otherwise it proceeds to step s720.

In step s738, the SHF determines whether it has an interface to the old SHF. If it does, then the process proceeds to step s739, otherwise the process proceeds to step s722

In step s739, the SHF sends to the old SHF an Information Request (IR) message indicating "normal" registration. After step s739, the process goes to step s718, described above.

Figure 8:
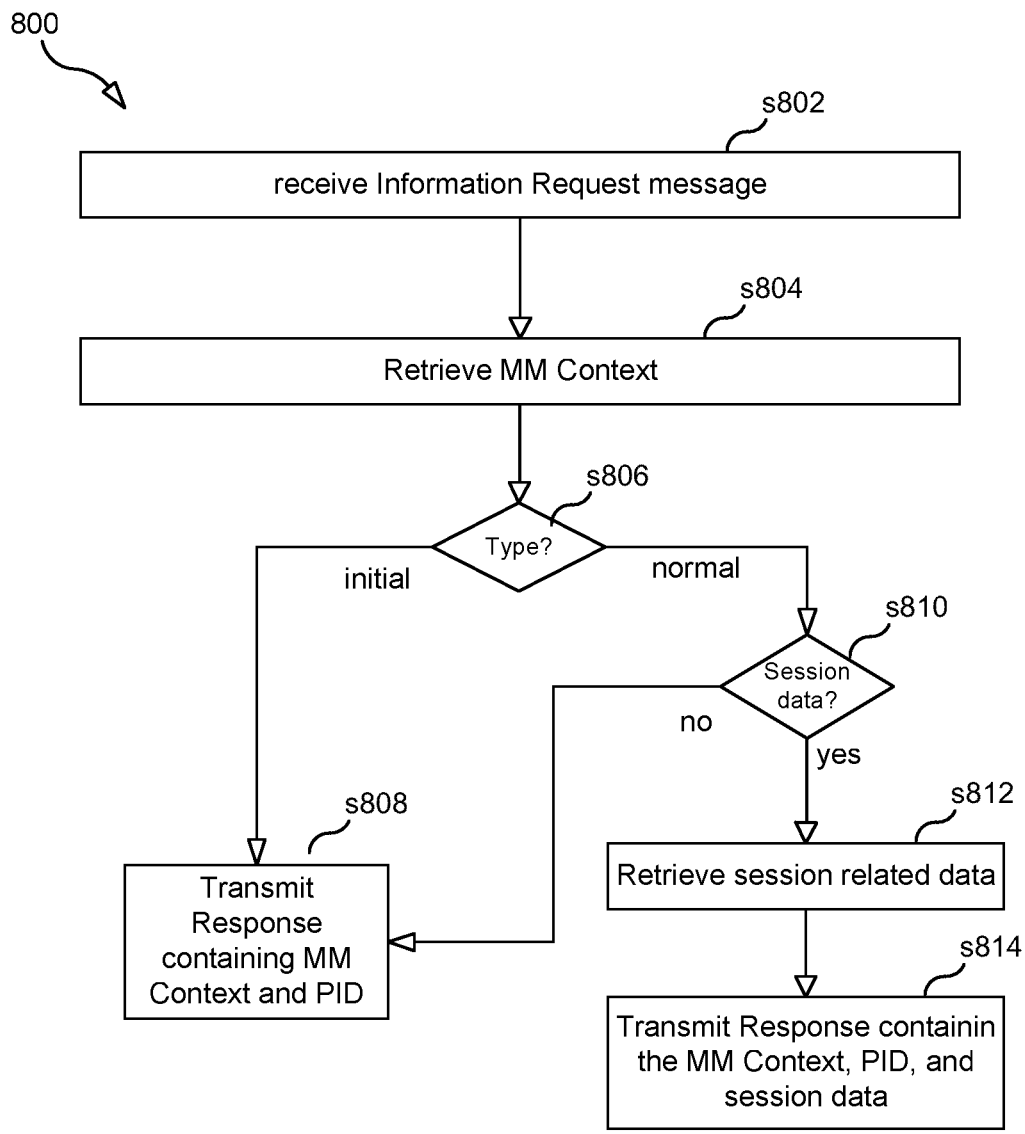
FIG. 8 is a flowchart illustrating a process according to some embodiments.

Referring now to FIG. 8, FIG. 8 is a flow chart illustrating a process 800, according to some embodiments, that is performed by an old SHF.

In step s802, the old SHF receives from a new SHF an Information Request (IR) message (described above).

In step s804, the old SHF uses the UE identifier included in the IR to obtain from a data storage system context information (e.g., MM Context) for the identified UE.

In step s806, the old SHF examines the registration type information included in the IR message to determine the registration type requested by the UE (e.g., initial or normal).

If the UE is requesting initial registration, then the process proceeds to step s808, otherwise it proceeds to step s810.

In step s808, the old SHF transmits to the SHF that transmitted the IR an Information Response comprising the context information retrieved in step s804 and a PID for the UE.

In step s810, the old SHF determines whether it has any session data for the identified UE. If there is no session data for the UE, the process proceeds to step s808, otherwise it proceeds to step s812.

In step s812, the old SHF retrieves the session data.

In step s814, the old SHF sends to the SHF that sent the IR an Information Response comprising the context information retrieved in step s804, the session data obtained in step s812, and a PID for the UE.

Figure 9:
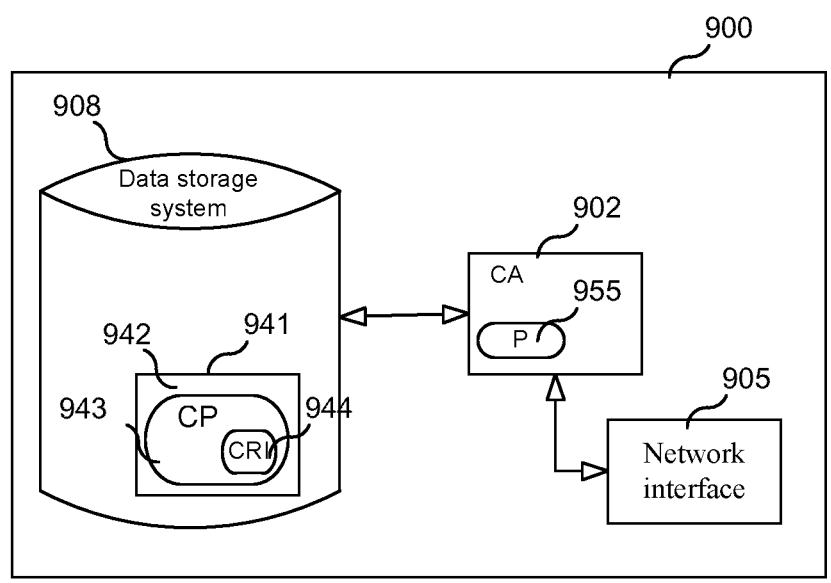
FIG. 9 is a block diagram of a CN node for implementing one or more CN functions.

FIG. 9 is a block diagram of a computer system 900 for implementing one or more of the above described functions (e.g., SHF, CCF, CHF). That is, in some embodiments, for each of the above described functions, the system 100 includes a separate computer system 900 for implementing each function, but in other embodiments, one or more (or all) functions may be implemented using only a single computer system 900. As described below, computer system 900 may consist of a single computer apparatus 902 or set of computer apparatuses (i.e., computer system 900 may be a cloud computing system).

As shown in FIG. 9, computer system 900 includes at least one computer apparatus (CA) 902, which may include one or more processors 955 (e.g., one or more general purpose microprocessors and/or one or more data processing circuits, such as an application specific integrated circuit (ASIC), field-programmable gate arrays (FPGAs), logic circuits, and the like). In some embodiments, computer system 900 includes a plurality of CAs 902, which may or may not be co-located. Thus, the above described function may be implemented in a cloud computing environment. In some embodiments, each function may correspond to a virtual machine hosted by computer system 900. Computer system 900 further includes: a network interface 905 for use in transmitting and receiving data via a communications link; and a data storage system 908, which may include one or more non-volatile storage devices and/or one or more volatile storage devices (e.g., random access memory (RAM)). In embodiments where computer apparatus 902 includes a microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media (e.g., a DVD), memory devices (e.g., random access memory), and the like, but not a signal. In some embodiments, the CRI of computer program 943 is configured such that when executed by computer apparatus 902, the CRI causes the computer apparatus 902 to perform steps described above. In other embodiments, computer apparatus 902 may be configured to perform steps described herein without the need for code. That is, for example, computer apparatus 902 may consist merely of one or more ASICs. Hence, the features of the embodiments described herein may be implemented in hardware and/or software.

Figure 10:
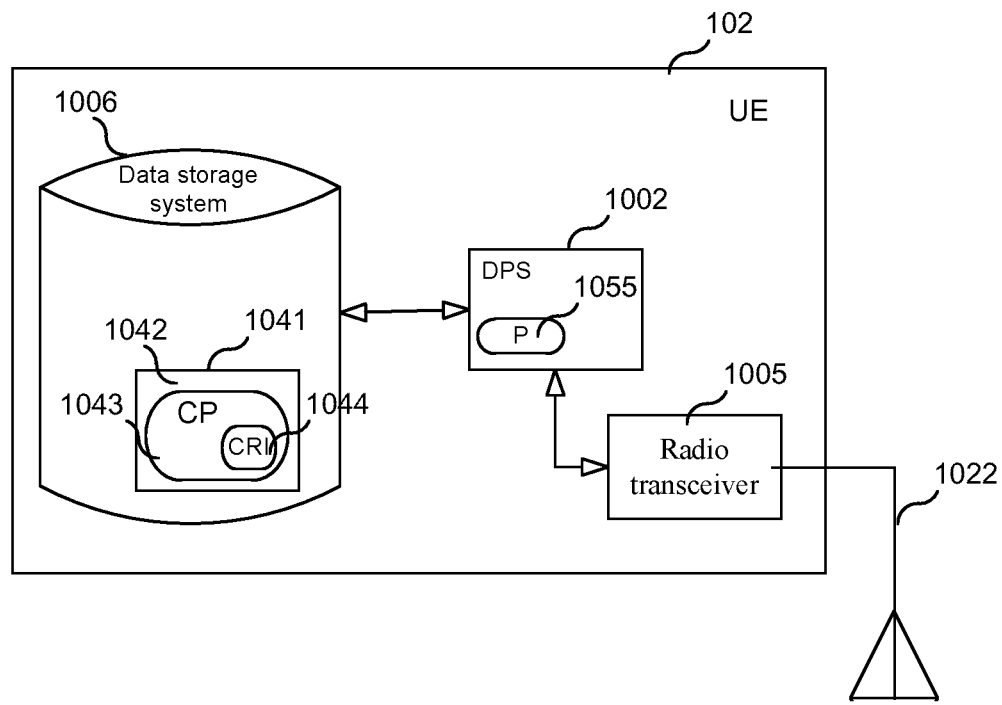
FIG. 10 is a block diagram of a UE according to some embodiments.

FIG. 10 is a block diagram illustrating UE 102 according to some embodiments. In the embodiment shown, UE 102 includes at least one data processing system (DPS) 1002, which may include one or more processors 1055 (e.g., one or more general purpose microprocessors and/or one or more data processing circuits, such as an application specific integrated circuit (ASIC), field-programmable gate arrays (FPGAs), logic circuits, and the like). UE 102 further includes: a radio transceiver 1005 for use in transmitting and receiving data via an antenna 1022; and a data storage system 1006, which may include one or more non-volatile storage devices and/or one or more volatile storage devices (e.g., random access memory (RAM)). In embodiments where DPS 1002 includes a microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited, to magnetic media (e.g., a hard disk), optical media (e.g., a DVD), memory devices (e.g., random access memory), and the like, but not a signal. In some embodiments, the CRI of computer program 1043 is configured such that when executed by computer apparatus 1002, the CRI causes the computer apparatus 1002 to perform steps described above. In other embodiments, computer apparatus 1002 may be configured to perform steps described herein without the need for code. That is, for example, computer apparatus 1002 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
    transmitting via an access network towards a signal handling function (SHF) of a core network a message to register the UE in a non-registered state, the message includes a message type identifier identifying the message is a Registration Request, a registration type Information Element (IE) indicating the Registration Request is for an initial registration by the UE and a permanent identifier (PID) allocated to the UE as an identification for the UE;
    receiving from the SHF a Registration Accept message comprising a temporary identifier;
    responding to the SHF with a Registration Complete indicating the UE has accepted the temporary identifier;
    when performing idle mobility or after a predefined time period and the UE is in a registered state, transmitting to the core network a second message comprising the message type identifier similarly identifying the second message as the Registration Request, the registration type IE indicating the Registration Request is other than the initial registration, and the temporary identifier as the identification for the UE; and
    receiving a second Registration Accept message.

2. The method of claim 1, wherein the registration type IE comprises a numerical value or a string value indicating an initial registration type or a registration type other than the initial registration type.

3. The method of claim 1, wherein the access network is one of fifth generation Radio access technology, Wireless Local access network (WLAN) or fixed access network.

4. The method of claim 1, wherein the method further comprises:
    in response to transmitting the second message comprising the message type identifier similarly identifying the second message as the Registration Request, receiving an identity request message from the core network indicating that the UE provides the PID; and
    transmitting to the core network an identity response comprising the PID.

5. The method of claim 1, wherein the second Registration Accept message comprises a new temporary identifier.

6. A non-transitory computer readable medium storing a computer program for configuring a user equipment (UE) to perform the method of claim 1.

7. A user equipment (UE), the UE comprising:
    a receiver;
    a transmitter; and
    processing circuitry, wherein the UE is operable to:
    transmit via an access network towards a signal handling function (SHF) of a core network a message to register the UE in a non-registered state, the message includes a message type identifier identifying the message is a Registration Request, a registration type Information Element (IE) indicating the Registration Request is for an initial registration by the UE and a permanent identifier (PID) allocated to the UE as an identification for the UE;
    receive from the SHF a Registration Accept message comprising a temporary identifier;
    respond to the SHF with a Registration Complete indicating the UE has accepted the temporary identifier;
    when the UE performs idle mobility or after a predefined time period and the UE is in a registered state, transmit to the core network a second message comprising the message type identifier to similarly identify the second message as the Registration Request, the registration type IE to indicate the Registration Request is other than the initial registration, and the temporary identifier as the identification for the UE; and
    receive a second Registration Accept message.

8. The UE of claim 7, wherein the registration type IE comprises a numerical value or a string value indicating an initial registration type or a registration type other than the initial registration type.

9. The UE of claim 7, wherein the access network is one of fifth generation Radio access technology, Wireless Local access network (WLAN), or fixed access network.

10. The UE of claim 7, wherein the UE is further operable to:
    after the UE transmits the second message comprising the message type identifier similarly identifying the second message as the Registration Request, receive an identity request message from the core network to indicate that the UE provides the PID; and
    transmit to the core network an identity response comprising the PID.

11. The UE of claim 7, wherein the second Registration Accept message comprises a new temporary identifier.

* * * * *